United States Patent [19]

Kilstofte

[11] 4,248,176
[45] Feb. 3, 1981

[54] LIVESTOCK MEDICATOR APPARATUS

[75] Inventor: Ray R. Kilstofte, Story City, Iowa

[73] Assignee: True Med, Inc., Story City, Iowa

[21] Appl. No.: 19,093

[22] Filed: Mar. 9, 1979

[51] Int. Cl.³ .............................................. A01K 7/02
[52] U.S. Cl. .......................................... 119/72; 119/75
[58] Field of Search ...................... 119/72, 71, 73, 75; 137/563, 569; 366/136, 137

[56] References Cited

U.S. PATENT DOCUMENTS

| | | | |
|---|---|---|---|
| 2,692,798 | 10/1954 | Hicks | 137/563 X |
| 3,049,094 | 8/1962 | Smith | 119/75 |
| 3,166,020 | 1/1965 | Cook | 366/137 X |
| 3,221,706 | 12/1965 | Johnson | 119/73 |
| 3,313,272 | 4/1967 | Moloney | 119/71 X |

*Primary Examiner*—Hugh R. Chamblee
*Attorney, Agent, or Firm*—Zarley, McKee, Thomte, Voorhees & Sease

[57] ABSTRACT

A medication mixing and holding tank having a medicated fluid outlet, a pump associated with the tank for pumping medicated fluid from medicated fluid outlet to a livestock watering line, and associated with the tank and pump and outlet recirculating line for agitating and recirculating fluid in the holding tank when no demand is made on the livestock watering line the unit dispenses substantially homogeneously mixed medicated fluid whenever a use demand is made on the livestock watering line. When all treating fluid is dispensed, the unit is automatically hooked into the fresh water line for continued dispensing of fresh water. The same tank is used for simultaneously mixing and metering.

5 Claims, 5 Drawing Figures

LIVESTOCK MEDICATOR APPARATUS

BACKGROUND OF THE INVENTION

Much of the livestock produced in this country today is produced in confinement feeding operations. In these operations, the livestock are kept within a small confined area with their daily waste materials swept away into large pits and circulated for removal. Likewise, the daily feed rations for the animals are often fed in mechanized fashion to the various stalls or bins in the confinement feeding operation. Typically, such confinement feeding operations have a watering system for feeding water directly to each of the confinement bins so that the animals may on a free choice basis drink water as their systems demand it.

From time to time as the animals are confined at various stages of development within the unit appropriate drugs, antibiotics, vitamins, nutrients and the like are needed by such animals. These will generally be referred to herein as "medication". Many of the medications needed by the animals are not fluid medications and thus must be mixed in slurry form with their drinking water.

Naturally, in order to assure uniform dispensation of equal amounts to the animals to be treated, it is necessary that the medication be homogeneously mixed with the drinking water. From time to time various devices have been invented to accomplish this desired purpose. Generally, such devices operate on a venturi principle wherein fresh water is metered into a mixing zone and an associated vessel of medication concentrate is metered into the mixing zone either by suction created by pressure or other means. Inside of the mixing zone an impeller mixes the two and they are simultaneously dispensed through a common medication line. However, such units have deficiencies in that control of concentration of the medication is difficult if not impossible. Additionally, such units often employ complicated valve systems and in some instances filtering systems which clog frequently, necessitating shut-down and cleaning. There is also no real satisfactory way of measuring amounts employed in such units since fresh water feed is continually occurring.

Accordingly, one object of this invention is to provide a medication mixing and dispensing tank which does not employ complex mechanical mixing units.

Another object of this invention is to provide a medication mixing and holding and dispensing tank which allows accurate measurement for concentration of treating medicated fluid.

Another object of this invention is to provide a medication mixing, holding and dispensing tank which simultaneously mixes and meters from a single tank holding receptacle.

A still further object of this invention is to provide a mixing, holding and dispensing tank which dispenses medicated fluid only when demand is made on the fresh water line by livestock.

Another object of this invention is to provide a mixing, holding and dispensing tank which continually agitates and mixes medicated fluid within the tank during all times that no demand on the livestock watering system is made.

Another object of this invention is to provide a mixing, holding and dispensing tank which, after dispensing all medication, automatically continues fresh water feed.

An even further object of this invention is to provide a medication mixing, holding and dispensing tank which accurately allows measurement of fluid concentration.

Yet another object is to provide a medication mixing, holding and dispensing tank which assures substantial homogeneity of the mixed medicated fluid and which may be used indefinitely without fear of clogging.

The method and means of accomplishing these, as well as other objects of the invention will become apparent from the detailed description which follows.

SUMMARY OF THE INVENTION

A medication mixing, holding and dispensing tank which continually agitates medicated fluid when no demand is made on the livestock watering system and which automatically dispenses medicated fluid when a demand is made on the livestock watering system. Additionally, the unit, after dispensation of its entire medicated fluid, automatically continues to dispense only fresh water. The unit also continually agitates and mixes the medicated fluid to assure homogeneity of concentration during times when no demand is made on the livestock watering system. Importantly, all of these advantages are achieved in a single tank which simultaneously mixes and dispenses as well as automatically continues to dispense only fresh water after the medication is consumed.

DETAILED DESCRIPTION OF THE INVENTION

Figure 2:
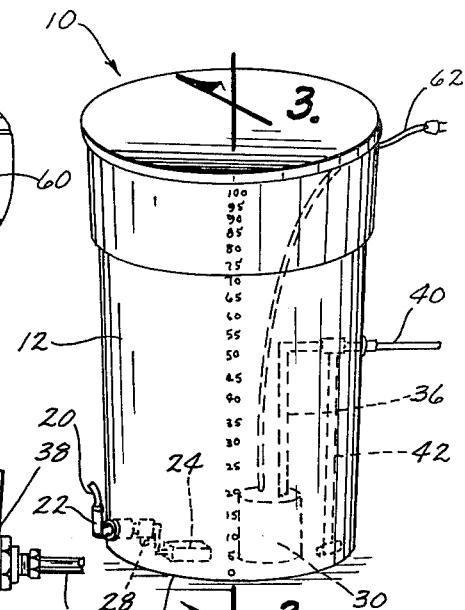
FIG. 2 is an elevated perspective view of the tank of this invention.

The medicator, referred to generally as 10, is a tank shown as having a continuous sidewall 12, a bottom 14, and a removable top cover 16. As seen in FIG. 2, the outside of the tank has measurements indicating the number of gallons at incremental liquid levels. Typically such tanks for most confinement operations, may be 100 to 140 gallon tanks. They may be constructed of a variety of materials, but polyethylene tanks which are substantially inert to all medicaments which might be placed therein, are found especially durable, lightweight and therefore satisfactory.

Adjacent the bottom of the medicator 10 is a fresh water inlet line 20 which is, on the inside of the tank, in communication with check valve 22 and a float valve of conventional construction designated at 24. Check valve 22 prevents medicated fluid 26 from being sucked back into fresh water line 20. Float valve 24 is actuated by emptying fluid 26 from tank 10 and automatically, when actuated, allows fresh water to be fed directly into tank 10 via conduit 28.

Figure 3:
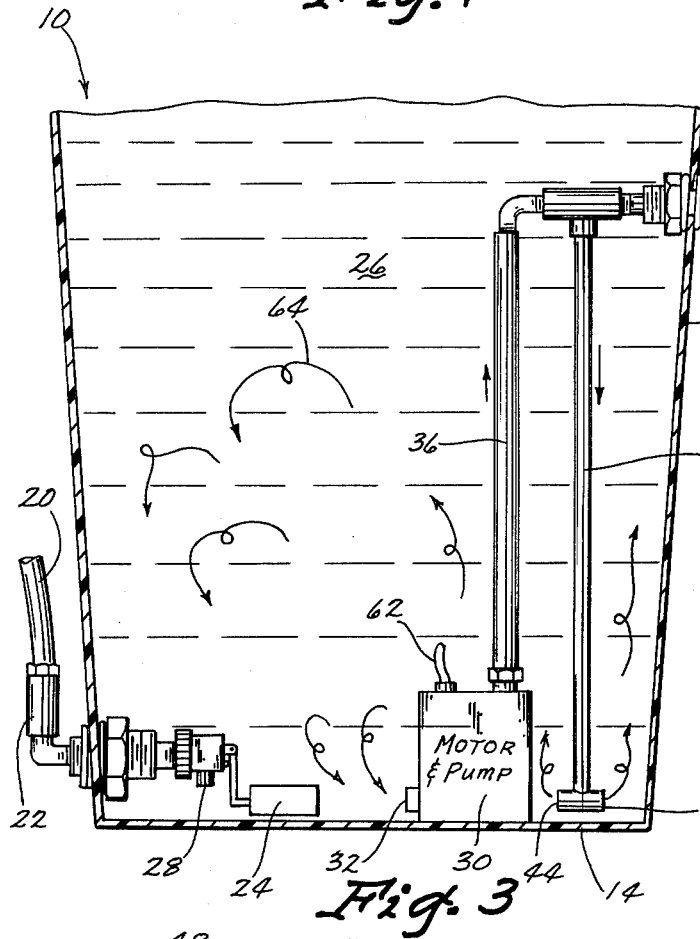
FIG. 3 is a sectional view along line 3—3 of FIG. 2.

As depicted in FIGS. 2 and 3, positioned on the bottom 14 of tank 10 is a submersible motor driven pump 30. The fluid is drawn in via pump inlet opening 32 as depicted by arrows 34 and pumped into pump outlet conduit 36. Pump outlet conduit 36 is associated, via a suitable sealing gasket and the like, with tank outlet 38 and is therefore in communication with outlet line 40. Positioned between pump outlet line 36 and tank outlet 38 is recirculation line or conduit 42. Recirculation line or conduit 42 is in open communication with pump outlet line 36, but is of smaller inside diameter than line 36.

Figure 4:
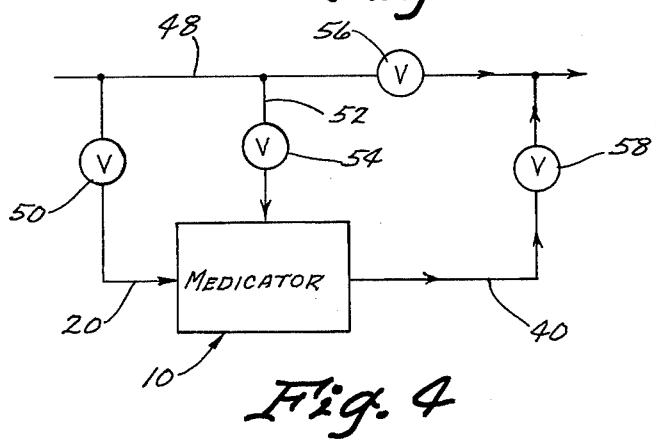
FIG. 4 is a schematic view of the flow circuitry for the unit.

As can be seen in FIGS. 2 and 3, recirculating line 42 extends downwardly towards the bottom of tank 10 and terminates in recirculation openings 44 and 46. In looking at FIG. 4, the position of tank 10 in the overall watering line is schematically illustrated. The main fresh water line is depicted at 48. Fresh water inlet line 20 joins fresh water line 48 with an intermediate opening and closing valve of conventional construction 50 positioned thereon. Downstream from line 20 and also in association with the main fresh water line 48 is top inlet line 52 with an associated on-off valve 54. Line 52 is to allow introduction of water, if desired, into the top of tank 10. Downstream from inlet line 52 on main fresh water line 48 is a third conventional on-off valve 56. Finally, outlet line 40 from tank 10 joins in fresh water line 48 downstream from valve 56 with an appropriate intermediately positioned valve 58.

It can therefore be seen that if desired, fresh water may be filled in the top of medicator 10 via line 52 and on-off valve 54. Thereafter, if on-off valve 56 on main water line 48 is shut, all water fed to the individual trough must pass through valve 50 and line 28 and through medicator 10, outlet line 40 and valve 58, and then return to main water line 48 downstream of valve 56.

Figure 1:
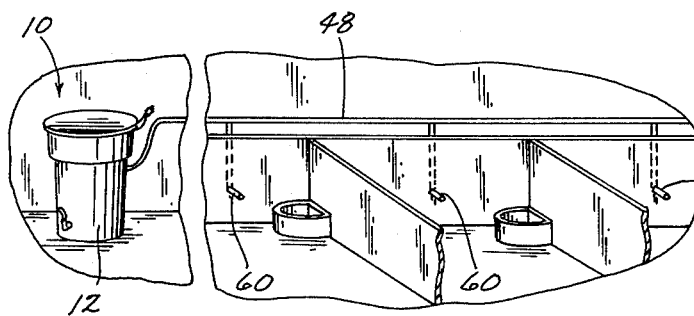
FIG. 1 shows the tank of this invention associated with stalls of a livestock confinement operation.

As depicted in FIG. 1, fresh water line 48, downstream from tank 10 and its associated valving is associated with a plurality of drinking nipples 60. Thus, when animals activate drinking nipples 60, fluid is dispensed for their use. Likewise, it can best be seen in FIG. 3, associated with submersible pump 30 is appropriate electrical connecting cord 62.

In operation, the device works as follows: Description will be given assuming that fresh water is constantly within line 48 maintaining a pre-determined pressure. For example, the operator desires a 10% by volume medicated fluid, the top cover 16 is removed, and the active medicament dumped in to the 10 gallon level. Valve 54 is opened and fresh water enters the top until tank 10 is filled to 100 gallon level, at which point valve 54 on line 52 is closed. Pump 30 is activated via electrical connecting cord 62 to begin pumping operation. At this time, valve 50 on fresh water inlet line 20 is closed, along with valve 56 and valve 58 until substantial homogeneous mixing within tank 10 has occurred. Medicated fluid is drawn into submersible pump 30 via pump opening 32 and pumped into line 36. From line 36 it recirculates via line 42 and this recirculating action is continued until substantial homogeneous mixing has occurred. At this point, start-up is completed.

Valve 58 on tank outlet line 40 is then opened. The unit is now ready for simultaneous mixing and dispensing as livestock watering demand is made.

When livestock actuate nipple valves 60, a pressure drop occurs in line 48. As a result, fluid from line 36 bypasses line 42, since it is of smaller inside diameter and greater pressures is required to force fluid down into line 42, and passes directly through outlet 38 into line 40, back to main fresh water line 48 and is fed directly to drinking nipples 60. However, when water or drinking nipples 60 are not being used, full pressure is maintained in line 48, causng fluid which is maintained under pressure in line 36, via pump 30, to be recirculated via recirculation and agitation line 42 back into the bottom of tank 10 via recirculation line outlets 44 and 46. In this manner, constant recirculation and agitation is maintained in tank 10 in order to assure substantial homogeneity of medicated treating fluid 26 in tank 10 as depicted by arrow 64. Again, however, when livestock watering demand is made, line 42 is bypassed and treating fluid is fed via line 40 through valve 58 back to main watering line 48. This process continues until all of the medicament fluid in tank 10 is consumed. At this point, float valve 24 is activated and fresh water is then fed into the bottom of tank 10 via fresh water inlet line 20, through check valve 22, and outlet 28 as depicted. Thus, when all medicament is consumed, pump 30 continues to pump fresh water into the unit. In this manner, the operator does not have to worry about shut-off of the system when medicament is all consumed since it continually operates to feed fresh water until the next supply of medicament is needed. Check valve 22 prevents any possibility of back flow of medicament into the main water line when it is desired to feed only fresh water.

When the next unit of medicament is needed, tank 10 is again filled as previously described and the process repeated. It can therefore be seen that simultaneous mixing, holding and dispensing is accomplished in a single tank. Moreover, dispensing is accomplished only when demand is made by watering livestock. Additionally, when dispensing is not needed because no demand is made by watering livestock, the unit constantly agitates and recirculates the treating fluid to provide assured homogeneity. Finally, when all medicament is consumed, the unit automatically feeds fresh water, thus eliminating the necessity for constant operator attention. Additionally, at any given time, the amount of medicament consumed can be accurately measured by a measuring scale provided on tank 10. Also worthy of mention is that all mixing and agitation is accomplished by pressure differentials between line 36 and line 42 of smaller diameter. In this manner, even when solid medicaments are employed, since no complex filters or valve mechanisms are employed, clogging of the unit is prevented.

Figure 5:
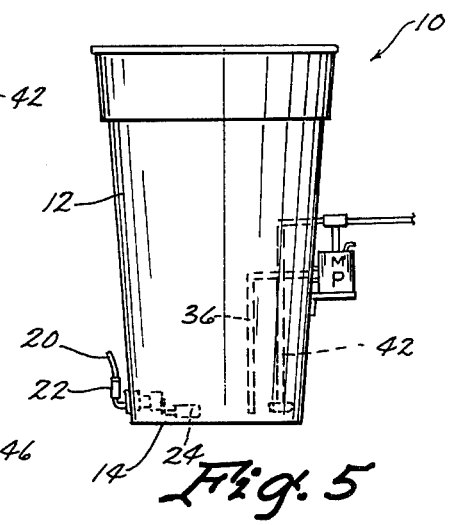
FIG. 5 is a frontal view in elevation of an alternative embodiment showing pumping means mounted outside of the tank of the invention.

FIG. 5 shows an alternative embodiment of the invention which operates in exactly the same manner but shows pump 30 mounted on the outside of tank 10 in the event that such is preferred.

It can therefore be seen that the invention accomplishes at least all of its stated objects.

What is claimed is:

1. A medication mixing, holding and dispensing, tank, having a medicated fluid outlet line
   a pump associated with said tank and said fluid outlet line for pumping medicated fluid from said tank through said medicated fluid outlet line to a livestock watering line,
   a fluid recirculating line positioned between said pump and said medicated fluid outlet, which is in open communication with said medicated fluid outlet line at one end and with the interior of said tank at its other end,
   said fluid recirculating line being of smaller inside diameter than said medicated fluid outlet line and which continuously agitates and recirculates fluid in said tank when no demand is made upon said livestock watering line, and which is automatically substantially bypassed for dispensing agitated, substantially homogeneous medicated fluid whenever a use demand is made on said livestock watering line, said tank having a fresh water inlet positioned adjacent the bottom of said tank, and a float valve positioned inside of said tank in association with said fresh water inlet for activation to feed fresh water into said tank whenever said tank is substantially depleted of medicated fluid.

2. The device of claim 1 wherein said pump is a submersible pump positioned inside of said tank.

3. The device of claim 1 wherein a check valve is associated with said fresh water inlet to prevent back flow into said fresh water line.

4. The device of claim 1 wherein said tank is made of substantially inert material.

5. The device of claim 4 wherein said tank is made of polyethylene.

* * * * *